United States Patent
Worley, III et al.

(10) Patent No.: US 10,044,196 B1
(45) Date of Patent: Aug. 7, 2018

(54) UTILITY DISTRIBUTION INFRASTRUCTURE

(71) Applicant: AMAZON TECHNOLOGIES, INC., Seattle, WA (US)

(72) Inventors: William Spencer Worley, III, Half Moon Bay, CA (US); Louis Leroi Legrand, III, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/967,098

(22) Filed: Dec. 11, 2015

Related U.S. Application Data

(63) Continuation of application No. 13/794,966, filed on Mar. 12, 2013, now abandoned.

(51) Int. Cl.
*H02J 5/00* (2016.01)
*H01F 38/14* (2006.01)
*H04B 5/00* (2006.01)
*A47F 5/00* (2006.01)

(52) U.S. Cl.
CPC ............ *H02J 5/005* (2013.01); *A47F 5/0043* (2013.01); *A47F 5/0081* (2013.01); *H01F 38/14* (2013.01); *H04B 5/0037* (2013.01)

(58) Field of Classification Search
CPC ...................................................... H01H 27/42
USPC ......................................................... 307/104
See application file for complete search history.

(56) References Cited

U.S. PATENT DOCUMENTS

| 8,604,908 B1 | 12/2013 | Kuniavsky et al. |
| 2010/0290215 A1* | 11/2010 | Metcalf ................. A47B 21/00 362/127 |
| 2013/0201030 A1* | 8/2013 | Johnson .................. H04Q 9/00 340/870.02 |
| 2013/0207478 A1 | 8/2013 | Metcalf et al. |
| 2016/0058172 A1 | 3/2016 | Johnson et al. |

FOREIGN PATENT DOCUMENTS

WO    2016097436    12/2015

OTHER PUBLICATIONS

Deberadinis, Robert L., "Notice of Allowance dated Sep. 14, 2015", U.S. Appl. No. 13/794,966. The United States Patent and Trademark Office, Sep. 14, 2015.

* cited by examiner

*Primary Examiner* — Robert Deberadinis
(74) *Attorney, Agent, or Firm* — Lindauer Law PLLC

(57) ABSTRACT

Described herein are systems and devices for providing a utility distribution infrastructure for one or more moveable pieces of active furniture. The utility distribution infrastructure is configured to provide one or more utilities such as electrical power, heating, cooling, fluid, gas, communications, and so forth, to one or more pieces of active furniture, which may be repositioned within the infrastructure.

22 Claims, 11 Drawing Sheets

1002 DETERMINE A FIRST PHYSICAL LOCATION OF A PIECE OF ACTIVE FURNITURE

SHELF "B" AT C2 POWER ON C2

1004 DETERMINE MOTION OF THE PIECE OF ACTIVE FURNITURE TO A SECOND PHYSICAL LOCATION

MOTION +X

1006 ACTIVATE ONE OR MORE UTILITY COUPLINGS AT THE SECOND PHYSICAL LOCATION

POWER ON C6

1008 DEACTIVATE ONE OR MORE UTILITY COUPLINGS AT THE FIRST PHYSICAL LOCATION

POWER OFF C2-C5

UTILITY DISTRIBUTION INFRASTRUCTURE

PRIORITY

This application is a continuation of, and claims priority to, U.S. patent application Ser. No. 13/794,966 filed on Mar. 12, 2013, titled "Utility Distribution Infrastructure", the contents of which are incorporated by reference into the present disclosure.

BACKGROUND

Items may be stored, presented, retrieved from, and otherwise manipulated and moved around. The items may include products for sale, rental, which are used in the course of operations, and so forth. Traditional furniture to store, hold, or present these items has various limitations including limited or no access to various utilities, restricted mobility, and so forth.

Figure 1:
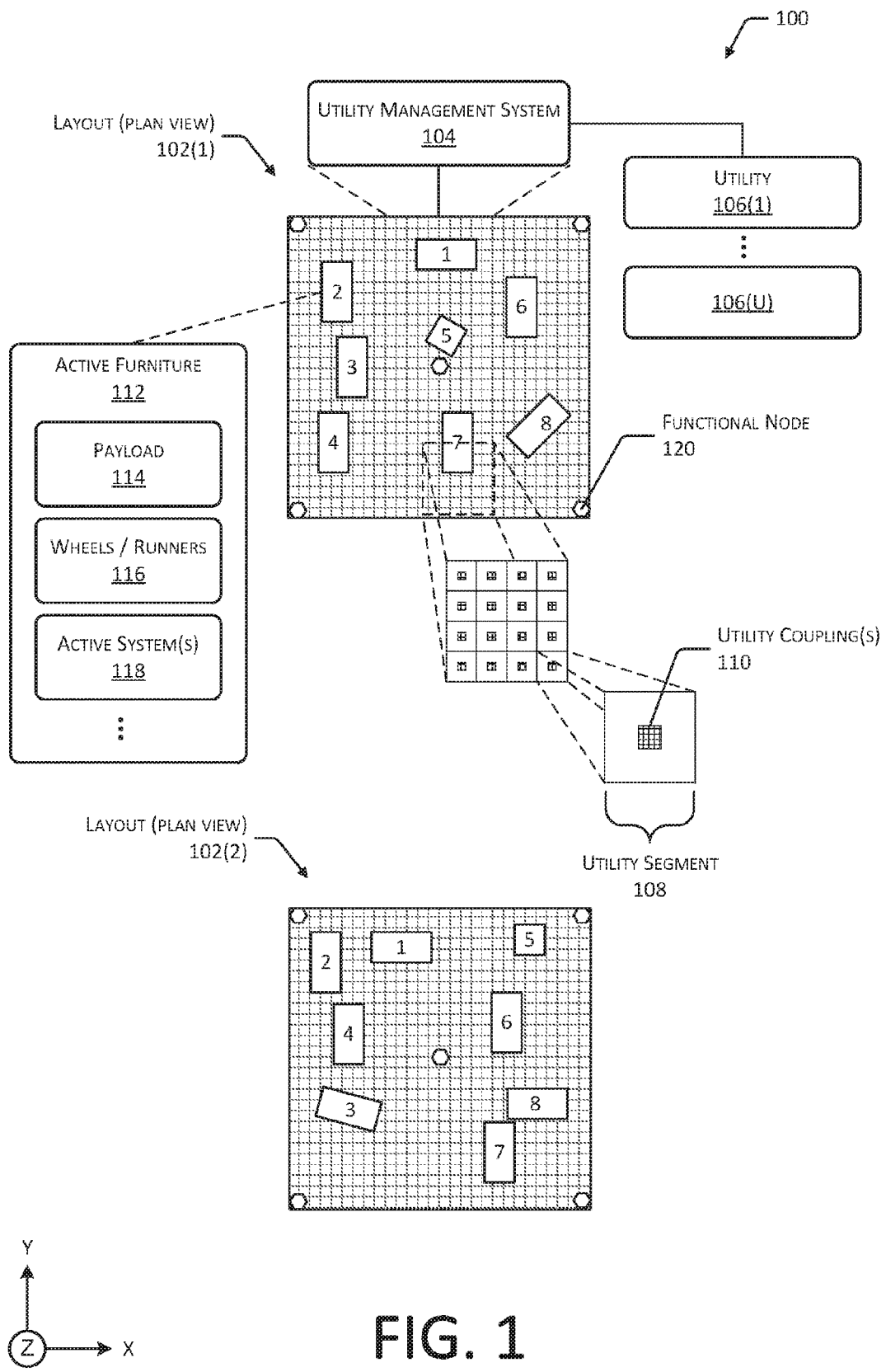
FIG. 1 is an illustrative utility distribution infrastructure configured to provide one or more utilities to active furniture that may be moved within the infrastructure.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

A variety of physical items ranging from food products to spare parts are handled every day in a variety of environments. These environments may include retail shops, wholesale supply houses, warehouses, factories, offices, libraries, medical facilities, dwellings such as homes or apartments, and so forth. Traditionally, these items are presented, contained, held, or supported by inactive furniture such as carts, shelving, display stands, and so forth. This inactive furniture is fixed in place or of limited mobility.

Described herein are devices and techniques for providing a utility distribution infrastructure that supports placement, relocation, and operation of one or more pieces of active furniture. The utility distribution infrastructure includes a floor that supports the one or more pieces of active furniture and provides a plurality of utility segments having utility couplings.

The utility segments have one or more of the utility couplings. In some implementations, the utility segments may be provided as tiles or blocks. The utility segments may be arranged to provide utility couplings at various points in an area. In some implementations, the utility segments may be arranged in a tessellated configuration with a repeating pattern. For example, every other utility segment may provide a utility coupling for electrical power.

The utilities provided may include electrical power, thermal energy such as heating or cooling, fluids, gasses, heating ventilation and air conditioning, safety, communications, and so forth. The utility couplings allow for the connection and distribution of one or more utilities to a piece of active furniture. The utility couplings may utilize physical contact or proximity to provide an exchange of energy, matter, or both.

The active furniture comprises one or more active systems that may utilize one or more of the utilities provided by the utility distribution infrastructure. The active furniture may include computing devices and associated input/output devices configured to support user interactions with one or more items, provide a user interface, and so forth. For example, sensors in the active furniture may detect the user picking up a particular item from the shelf. Based on this event, information about that item may then be presented on a display or associated with the active furniture. The active furniture thus supports a richer interaction experience between customers and the items.

Because the utility distribution infrastructure may provide the utility segments throughout the area, the active furniture may be readily reconfigured into new physical arrangements. The active furniture may be repositioned to another location that provides utilities necessary to support the active systems. Likewise, additional pieces of active furniture may be quickly and easily added or removed from the infrastructure. In some implementations, the utility distribution infrastructure may be configured to provide utilities, such as power and communications, while the active furniture is in motion.

The flexibility in arrangement, provisioning, and so forth, of the active furniture may be used to facilitate interactions between users and the items supported by the active furniture. Retail shops may be quickly reconfigured to showcase a particular item and improve customer flow and exposure to particular consumer items. Warehouses may be reconfigured to suit business needs of a particular day or hour by dynamically adjusting the location of shelving. Medical facilities may be rearranged to suit the demands of a particular incident with active furniture containing supplies, equipment, or both by being easily moved to particular locations while maintaining utility services.

Illustrative System

FIG. 1 is an illustrative utility distribution infrastructure 100 ("infrastructure") configured to provide one or more utilities. A first layout or plan view 102(1) depicts a floor plan of an area, such as a room. This room includes, or is coupled to, a utility management system 104. The utility management system 104 is configured to control provisioning of one or more utilities 106(1), 106(2), . . . , 106(U) to utility segments 108. This provisioning may include switching particular utilities 106 on or off to particular utility segments 108 or couplings therein. The utilities 106 may include electrical power, heating, cooling, fluids, gasses, communication, material transport, and so forth. The utilities 106 are discussed in more detail below with regard to FIG. 2, while the utility management system 104 is discussed in more detail below with regard to FIG. 3.

The utility segments 108 may be arranged in or on at least a portion of a floor of the infrastructure 100. In some implementations, the floor may comprise a plurality of utility segments 108, which may be interconnected with one another. The floor also serves to support the one or more pieces of active furniture. The utility segments 108 may be arranged in a regular repeating pattern, such as a tessellated pattern. Utility segments 108 that provide different utilities 106 may be present in the pattern and the infrastructure 100. For example, a first utility segment 108 may provide power, while a second utility segment 108 may provide compressed air. Non-utility segments, such as spacers, may also be included in the pattern. The utility segments 108 and non-utility segments may have the same or different shapes or sizes. For example, the utility segments 108 may be shaped as squares, while the non-utility segments may be shaped as triangles when viewed from above.

The utility segment 108 provides one or more utility couplings 110. The utility coupling 110 is configured to engage corresponding couplings in one or more pieces of active furniture 112. The utility couplings 110 may include one or more of plugs, receptacles, contacts, pads, fluid/gas connectors, optical interfaces, radio frequency waveguides, and so forth. The active furniture 112 may comprise shelves, racks, tables, carts, trolleys, desks, workbenches, cabinets, bookcases, chests, and so forth. In some implementations, the active furniture 112 may incorporate seating for people.

In this illustration, eight pieces of active furniture 112(1), 112(2), . . . , 112(8) are depicted. However, it is understood that in some implementations additional or fewer pieces of active furniture 112 may be present in the infrastructure 100. The active furniture 112 may be configured to present or support one or more items for a transaction, such as sale, rental, lease, or distribution. For example, the active furniture 112 may provide at least a portion of an interactive user interface to a user. This user interface may provide information about the one or more items, opportunities to purchase the one or more items, and so forth.

The active furniture 112 may be coupled to an external device, such as a cloud server, which is accessed with a wide area network, to facilitate the user's transaction involving the one or more items. The external device may be called to send additional information about the product, initiate shipment of the product, initiate a purchase transaction, or otherwise support the transaction. For example, the active furniture 112 may include shelves to hold canned vegetables, and use a user interface to call up additional information about those vegetables from the external device.

The utility coupling 110 may provide the utility 106 by way of physical contact or proximity with a corresponding device or structure on the active furniture 112. For example, the utility coupling 110 for compressed air may involve a mechanical fitting configured to engage a corresponding fitting on the active furniture 112. In comparison, a waste drain may involve proximity but not necessarily contact, allowing waste material to flow down from the active furniture 112 into a corresponding drain in the utility segment 108. Power and data may be transferred to the active furniture 112 using physical conduction or electromagnetic fields, such as with inductive power transfer, radio or optical communications, and so forth.

In one implementation, the utility segments 108 may comprise modular elements that may be interconnected. The utility segments 108 may be configured with one or more electrical conductors configured to provide or otherwise distribute electrical power to one or more adjacent utility segments 108.

In another implementation, the utility segments 108 may be predetermined areas associated with the utility couplings 110 that are incorporated into the flooring material along with cabling, piping, passages, and so forth. The utility couplings 110 may be distributed across the area of the floor. The utility couplings 110 may be embedded within the floor in some implementations. In other implementations, the utility couplings 110 may be arranged at or above an upper surface of the floor. For example, the utility couplings 110 may comprise strips or rails, which are adhered, bolted, or otherwise fixed atop the floor. In some implementations, at least a portion of the utility couplings 110 may be arranged within a receptacle that is at least partially within the floor.

The active furniture 112 may comprise a moveable chassis supporting a payload 114, wheels/runners 116 or another structure providing mechanical support, one or more active systems 118, and so forth. The payload 114 may comprise one or more items, or groups or assemblies of items. These may be items presented for display, purchase, lease, rental, consumption, and so forth. For example, the items may include books, food, consumer electronics, medicines, spare parts, and so forth.

The wheels/runners 116 or other structures may be configured to provide physical support to a structure of the active furniture 112, such as a furniture carcass. In some implementations, the wheels/runners 116 may be configured to couple with one or more of the utility couplings 110. For example, as described below with regard to FIG. 6, electrically conductive wheels may be used to transfer power between electrically conductive contacts in the utility coupling 110 and the one or more active systems 118. The wheels/runners 116 may be configured to mechanical or magnetically engage with one or more of the utility segments 108 to limit movement of the active furniture 112. For example, the utility segment 108 may include an electromagnet, which is configured to attract a passive magnetic assembly, such as a piece of ferrous material in the active furniture 112, to hold the active furniture 112 in place.

The one or more active systems 118 comprise devices which use one or more of the utilities 106. The active systems 118 may include computing devices, input/output devices, heating/cooling devices, illumination devices, heating ventilation and air conditioning ("HVAC") devices, safety sensors such as fire detectors, and so forth. The active systems 118 are discussed in more detail below with regard to FIG. 4.

The infrastructure 100 may also include one or more functional nodes 120. The functional nodes 120 may comprise input/output devices that are configured to support operations in the infrastructure 100. For example, the functional nodes 120 may be used to determine the relative position of the one or more pieces of active furniture 112 in the infrastructure 100. The functional nodes 120 may be placed on one or more of the floor, walls, ceilings, poles, one or more pieces of active furniture 112, and so forth. The functional nodes 120 are discussed in more detail below with regard to FIG. 5.

As described above, the infrastructure 100 allows for the active furniture 112 to be relocated to another location providing the one or more of the utilities 106. A second layout or plan view 102(2) depicts the floor plan in which some of the pieces of active furniture 112 have been relocated. For example, in this illustration, the piece of active furniture 112(5) has been relocated from about the middle of the floor to a corner. Due to the presence of the utility segments 108 throughout the floor, the active furniture 112(5) may be reconnected to the one or more utilities 106 after placement at a second location. In some implementations, some utilities 106 may be provided to the active furniture 112 during movement from a first location to a second location. Furthermore, in another implementation, the active furniture 112 may be configured to be in continuous motion, or frequently in motion, while still using one or more of the utilities 106.

Figure 2:
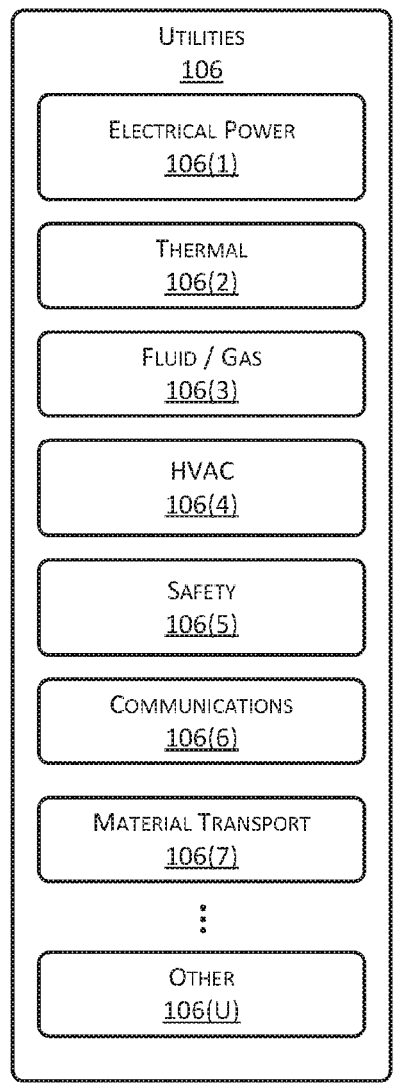
FIG. 2 illustrates a block diagram of various utilities that may be supported by the utility distribution infrastructure.

FIG. 2 illustrates a block diagram 200 of various utilities 106 that may be supported by the utility distribution infrastructure 100. The active systems 118 in the active furniture 112 may use one or more of the following utilities 106. Some utilities 106 may be configured to be accessible while the active furniture 112 is stationary, in motion, or both.

Electrical power 106(1) may be provided. The electrical power 106(1) may be provided using one or more conductors, which are incorporated into the utility segments 108, or which are connected to the utility segments 108. The electrical power 106(1) may be provided at particular voltages, frequencies, and so forth. For example, in one implementation, the voltage provided at a power rail may be less than 6 volts, measured relative to the ground. The electrical power 106(1) may be transferred from the utility segment 108 to the active furniture 112 using a utility coupling 110 with physical conductors or providing wireless power transfer. Wireless power transfer may include inductive coupling, capacitive coupling, electromagnetic transfer, and so forth. Wireless power transfer is discussed in more detail below with regard to FIG. 7.

Thermal utilities 106(2) include heat sinks, heat sources, hot rails, cold rails, heated or cooled fluids or gasses, and so forth, which are configured to provide a transfer of thermal energy. In one implementation, the thermal utilities 106(2) may comprise a cold rail, which is refrigerated. For example, a thermally conductive box in the active furniture 112 may be physically coupled to a thermal utility 106(2) cold rail to cool the thermally conductive box. In another implementation, a steam loop or other heated fluid may be provided to provide heat to the active furniture 112.

Fluid/gas utilities 106(3) may also be provided. For example, in a retail grocery environment, the fluid/gas utilities 106(3) may be potable water suitable to spray a payload 114 of vegetables held in a portion of the active furniture 112. In another example, the fluid/gas utilities 106(3) may include compressed air, natural gas, oxygen, nitrogen, disinfectants, and so forth.

HVAC utilities 106(4) may be provided. For example, the utility segments 108 may include couplings for air ducts suitable for distributing heating or cooling air, return air, and so forth. Continuing the example, the active furniture 112 may include ducting, air diffusors, and other apparatuses configured to direct warmed or cooled air from the HVAC utilities 106(4) to maintain the climate within the environment of the infrastructure 100.

Safety utilities 106(5) include communication and support systems for fire detectors, smoke detectors, fire suppression, carbon monoxide detection, carbon dioxide detection, alarm annunciators, emergency routing signage and prompts, and so forth. For example, the safety utilities 106(5) may include one or more dedicated communication channels to receive data from fire detectors or activate alarm annunciators such as strobe lights and sirens. In another example, the safety utilities 106(5) may include distribution of fire suppression materials such as carbon dioxide, bromotrifluoromethane, argon, water, suppressant foam, and so forth.

Communication utilities 106(6) provide for the transfer of signals carrying data between one or more of the active systems 118 of the active furniture 112 and other devices. For example, the active furniture 112(1) may communicate with the active furniture 112(2) using the communication utilities 106(6). Or the active systems 118 may communicate with the utility management system 104, the one or more functional nodes 120, and so forth. The communication may be provided using wired or wireless mechanisms. The communication utilities 106(6) may include, but are not limited to, a data bus, wired local area network, wireless local area network, wide area network, and so forth. For example, the communications utilities 106(6) may provide the active furniture 112 with connectivity to external devices such as cloud servers accessible by a wide area network such as the Internet.

The communication utility 106(6) may be supported by a communication system configured to transfer data using one or more of the plurality of utility couplings 110. This may include a utility coupling 110 dedicated for the communication utility 106(6), or also use one or more other utility couplings 110. In one implementation, the electrical power utility 106(1) may be used to support the communications utility 106(6) by sending data signals along the wired or wireless links used to transfer power.

Material transport or material handling utilities 106(7) may provide for the physical transport of items to or from the active furniture 112. For example, items may be transported through pneumatic tubes, mechanical conveyors, and so forth. In other implementations, other utilities 106(U) may be provided.

Figure 3:
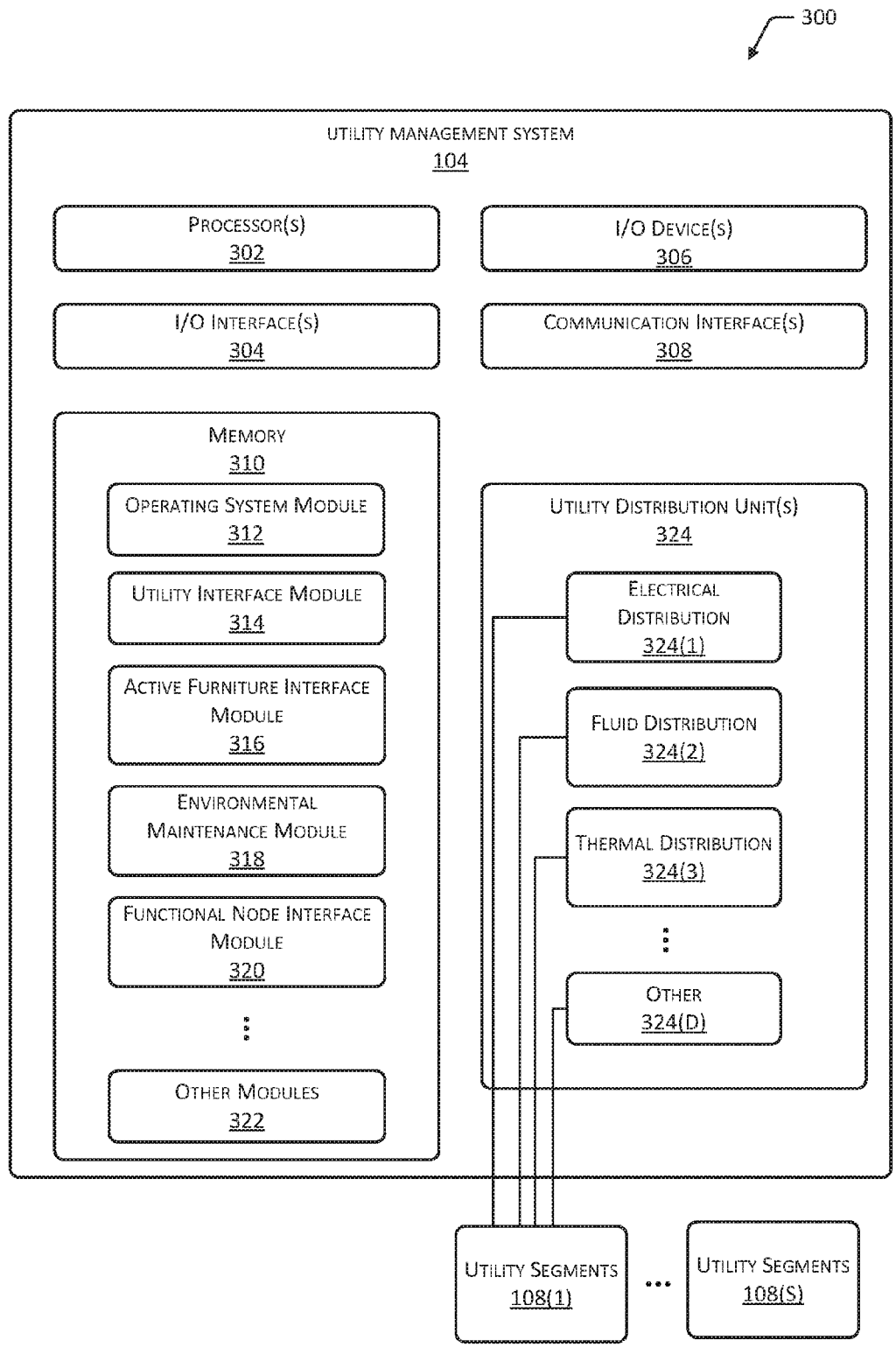
FIG. 3 illustrates a block diagram of a utility management system configured to manage distribution of the one or more utilities.

FIG. 3 illustrates a block diagram 300 of the utility management system 104 configured to manage distribution of the one or more utilities 106 in the infrastructure 100. The utility management system 104 may include one or more processors 302 configured to execute one or more stored instructions. The processors 302 may comprise one or more cores. The utility management system 104 may include one or more input/output ("I/O") interface(s) 304 to allow the processor 302 or other portions of the utility management system 104 to communicate with other devices. The I/O interfaces 304 may comprise Inter-Integrated Circuit ("I2C"), Serial Peripheral Interface bus ("SPI"), Universal Serial Bus ("USB") as promulgated by the USB Implementers Forum, RS-232, Fieldbus, IEC 61158, Process Field Bus ("PROFIBUS"), RS-485, BACnet, and so forth.

The I/O interface(s) 304 may couple to one or more I/O devices 306. The I/O devices 306 may include input devices such as one or more of a camera, a microphone, a touch sensor, a button, and so forth. The I/O devices 306 may also include output devices such as one or more of a display, audio speaker, haptic output device, and so forth. In some embodiments, the I/O devices 306 may be physically incorporated with the utility management system 104 or may be externally placed. For example, a tablet computer, smartphone, laptop, one or more of the functional nodes 120, or other devices may be used as an I/O device 306 to the utility management system 104.

The utility management system 104 may also include one or more communication interfaces 308. The communication interfaces 308 may be configured to provide communications between the utility management system 104 and other devices, such as functional nodes 120, the active furniture 112, routers, access points, and so forth. The communication interfaces 308 may include personal area networks, wired and wireless local area networks ("LANs"), wide area networks ("WANs"), and so forth. For example, the communication utility 106(6) may include Ethernet, Wi-Fi®, Bluetooth®, ZigBee®, and so forth. The communications interfaces 308 may be configured to couple to, or maintain, the communication utility 106(6). For example, the communication interfaces 308 may be used to provide communication with a WAN such as the Internet and one or more servers providing cloud services.

The utility management system 104 may also include one or more busses or other internal communications hardware or software that allow for the transfer of data between the various modules and components of the utility management system 104.

As shown in FIG. 3, the utility management system 104 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer readable instructions, data structures, program modules, and other data for the operation of the utility management system 104.

The memory 310 may include at least one operating system ("OS") module 312. The OS module 312 is configured to manage hardware resource devices such as the I/O interfaces 304, the I/O devices 306, the communication interfaces 308, and provide various services to applications or modules executing on the processors 302. Also stored in the memory 310 may be one or more of the modules described next. These modules may be executed as foreground applications, background tasks, daemons, and so forth.

A utility interface module 314 is configured to provide a user interface to one or more users using the output I/O devices 306 and accept input received from the input I/O devices 306. The user interface may include one or more visual, audible, or haptic elements. For example, the user interface may be configured to provide a graphic user interface on a portion of the active furniture 112.

The utility interface module 314 may also be configured to establish and support communications between the utility management system 104 and external control systems associated with the utilities 106. For example, the utility interface module 314 may be configured to communicate with a dedicated microcontroller controlling the HVAC system.

An active furniture interface module 316 is configured to support operation of the active furniture 112. For example, the active furniture interface module 316 may receive a request from the active furniture 112 to provide one or more utilities 106 to a particular utility segment 108, or utility coupling 110 therein, within the utility distribution infrastructure 100. In some implementations, the active furniture interface module 316 may provide for exchange of information between the active furniture 112 and the one or more functional nodes 120.

An environmental maintenance module 318 may be stored in the memory 310. The environmental maintenance module 318 may be configured to monitor or control the HVAC utilities 106(4), the safety utilities 106(5), illumination, and so forth, to provide a particular experience to the user. For example, the environmental maintenance module 318 may be configured to maintain a lighting pattern in the room. In some implementations, the environmental maintenance module 318 may be configured to provide for emergency exit annunciation and instructions suitable for the particular configuration of the active furniture 112 at a given instance. For example, after repositioning of the active furniture 112, the environmental maintenance module 318 may update emergency exit notification displays to show exit paths available.

A functional node interface module 320 in the memory 310 is configured to allow for interaction with the functional nodes 120. For example, the functional node interface module 320 may be configured to provide images for display using one or more image projectors in the functional nodes 120. In another implementation, the functional node interface module 320 may receive information from the one or more functional nodes 120. For example, information about the physical position in the infrastructure 100 of the one or more pieces of the active furniture 112 may be received from sensors in one or more functional nodes 120.

Other modules 322 may also be provided in the memory 310. For example, a speech recognition module may be configured to convert human speech into data suitable for processing by one or more other modules.

In some implementations, one or more of the modules or the functions described above may be stored, executed, or otherwise distributed to one or more devices. These devices may be external devices such as cloud servers, which are accessible using the WAN. For example, the speech recognition module may be executed, for which data is transferred to an external server for processing, and the results of that processing are received and used by the utility management system 104.

The utility management system 104 may include, or be coupled to, one or more utility distribution units 324(1), 324(2), . . . , 324(D). The utility management system 104 may include an electrical distribution unit 324(1), a fluid distribution unit 324(2), a thermal distribution unit 324(3), and so forth. The utility interface module 314 is configured to communicate with the one or more utility distribution units 324. The utility distribution units 324 may be configured to provide, and in some implementations, control distribution of utilities 106 to one or more of the utility segments 108 or particular utility couplings 110 therein.

The utility distribution units 324 may be configured to provide the corresponding utility segments 108 with the utility 106. For example, where the utility 106 comprises water, a manifold pipe may provide the water to the corresponding utility couplings 110. In some implementations, the utility distribution units 324 may be configured to control provisioning of the utility 106 to one or a group of the utility segments 108. For example, the electrical distribution unit 324(1) may be configured to energize the utility coupling 110 for power at a particular utility segment 108 associated with a piece of active furniture 112 that uses electrical power, while other un-associated or unused utility segments 108 are deactivated.

Other utility distribution units 324(D) may be provided. For example, a utility distribution unit 324 may be configured to operate the material transport utility 106(7) such as a conveyor or pneumatic delivery system. In another example, another utility distribution unit 324 may be configured to provide for distribution of fire suppression or cleaning agents.

In some implementations, the utility management system 104 may omit the processors 302. For example, the electrical power 106(1) and fluid/gas utilities 106(3) may be provided to a predetermined set of utility segments 108 that are coupled to corresponding utility feeds and continuously active or provisioned.

Figure 4:
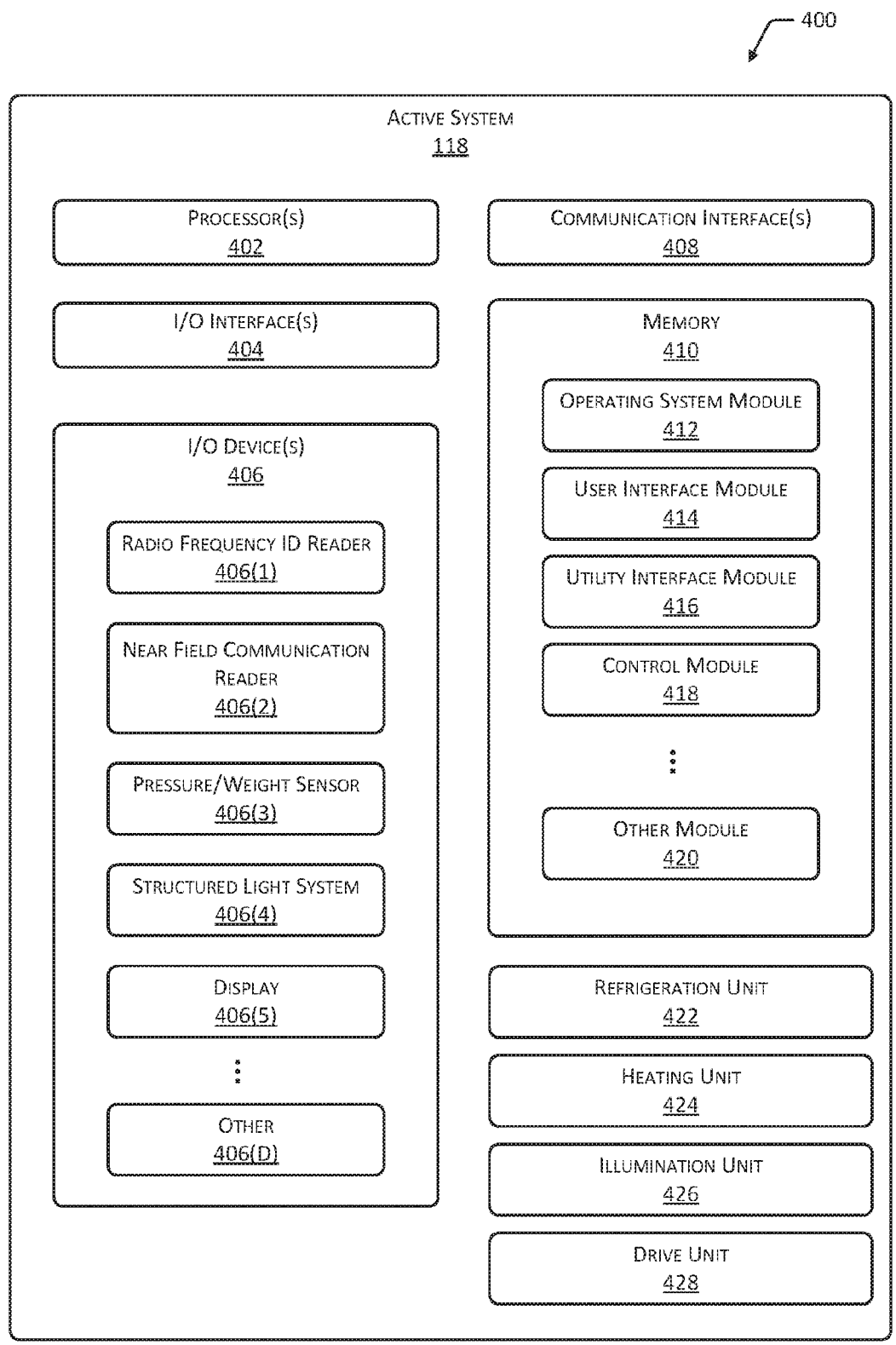
FIG. 4 illustrates a block diagram of an active system that may be present in the active furniture.

FIG. 4 illustrates a block diagram 400 of the active systems 118 that may be present in the active furniture 112. The active systems 118 comprise devices that use one or more of the utilities 106. In some implementations, the active systems 118 may use electrical, pneumatic, hydraulic, thermal, magnetic, or other sources to provide one or more services in support of operations involving the items in the payload 114.

In some implementations, the active system 118 may include one or more processors 402 configured to execute one or more stored instructions. The processors 402 may comprise one or more cores. The active system 118 may include one or more I/O interface(s) 404 to allow the processor 402 or other portions of the active system 118 to communicate with other devices. The I/O interfaces 404 may comprise I2C, SPI, USB, RS-232, and so forth.

The I/O interface(s) 404 may couple to one or more I/O devices 406. The I/O devices 406 may include input devices such as one or more of a camera, a microphone, a touch sensor, a button, and so forth. In some implementations, the one or more devices in the functional node 120 as described below with regard to FIG. 5 may be used as I/O devices 406.

In one implementation, the input devices 406 may include a radio frequency identification ("RFID") tag reader 406(1), a near field communication ("NFC") reader 406(2), a pressure/weight sensor 406(3), a structured light system 406(4), and so forth. The RFID tag reader 406(1) may be used to determine the presence of items labeled with RFID tags, an RFID tag associated with the user, with a particular location in the floor, and so forth. The NFC reader 406(2) is configured to provide for wireless transmission at short distances, such as under eight inches. Items in the payload 114, utility segments 108, and so forth, may include NFC tags or readers to determine the proximity of corresponding tags.

Pressure/weight sensors 406(3) may be used on one or more surfaces of the active furniture 112. For example, pressure sensors may be arranged on a shelf to determine presence of an item due to weight. Pressure sensors may also be arranged on surfaces to provide user input locations, such as buttons. These buttons may be "soft" or reconfigurable, or may be hardwired and associated with a dedicated function, such as opening a door on the active furniture 112.

The structured light system 406(4) may use structured light comprising a pattern projected onto objects in at least a portion of the infrastructure 100. A camera acquires an image of the portion of the infrastructure 100 including the projected pattern. Based at least in part on variations in the pattern due to interactions with the objects, information such as distance, surface contours, size, and other three-dimensional information may be acquired. For example, the structured light system 406(4) may be used to determine a particular item in the payload 114 the user is pointing a finger at, reaching towards, and so forth. The active system 118 may also use other I/O devices 406(D), such as those described below with regard to FIG. 5.

The I/O devices 406 may also include output devices such as one or more of a display 406(5), audio speaker, haptic output device, and so forth. The display 406(5) may include an electrophoretic display, cholesteric display, light emitting diode display, liquid crystal display, projection system, interferometric display, and so forth. In some embodiments, the I/O devices 406 may be physically incorporated with the active system 118 or may be externally placed. For example, a tablet computer, smartphone, laptop, functional node 120, or other device may be used as an I/O device 406 of the active system 118.

The active system 118 may also include one or more communication interfaces 408. The communication interfaces 408 may be configured to provide communications between the active system 118 and other devices, such as functional nodes 120, the utility management system 104, routers, access points, and so forth. The communication interfaces 408 may include personal area networks, wired and wireless LANs, WANs, and so forth. For example, the active system 118 may use the communication interface 408 to communicate with one or more cloud server devices accessible using a WAN such as the Internet. The communication interfaces 408 may be configured to couple to the communication utility 106(6).

The active system 118 may also include one or more busses or other internal communications hardware or software that allow for the transfer of data between the various modules and components of the active system 118.

As shown in FIG. 4, the active system 118 includes one or more memories 410. The memory 410 comprises one or more CRSM as described above. The memory 410 provides storage of computer readable instructions, data structures, program modules, and other data for the operation of the active system 118.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. Also stored in the memory 410 may be one or more of the following modules. These modules may be executed as foreground applications, background tasks, daemons, and so forth.

A user interface module 414 is configured to provide a user interface to one or more users using the I/O devices 406 and accept inputs received from the I/O devices 406, which may include the functional nodes 120. The user interface may include one or more visual, audible, or haptic elements. For example, the user interface may be configured to provide a graphic user interface using the display 406(5), an audible user interface using one or more speakers, and so forth.

The user interface provided by the user interface module 414 may be interactive and responsive to user inputs. User inputs may be received, and outputs based at least in part on those inputs may be provided to the user. For example, the user may press a control to request display of more information about an item resting on a portion of the active furniture 112. The information may then be presented by one or more of the display 406(5), the image projector 506(11), speakers, transmitted to a device of the user's such as a smartphone, and so forth.

The user interface module 414, in conjunction with other modules, may use the communication interfaces 408 to establish communication with one or more external devices such as cloud servers accessible using the WAN. The user interface module 414 may provide a user interface that allows the user to engage in a transaction involving one or more items. The transaction may be completed at least in part at the one or more external devices. For example, the user may request more information, purchase the item, request shipment of the item, and so forth. The external devices may then provide the information, process payment information, initiate shipment of the item, and so forth.

The memory 410 may include a utility interface module 416 configured to interact with the utility management system 104. For example, the utility interface module 416 may request delivery of a utility 106 such as electrical power 106(1) to a particular utility segment 108.

A control module 418 may be provided which is configured to provide functionality to the active system 118. For example, the control module 418 may be configured to unlock a door that contains a particular item after receiving purchase information from the user.

Other modules 420 may also be present. These other modules 420 may provide particular functionality such as enabling direct communication with a user device such as a smartphone.

The active system 118 may include one or more other devices, such as a refrigeration unit 422, a heating unit 424, an illumination unit 426, a drive unit 428, and so forth. For example, the refrigeration unit 422 may couple to the thermal utility 106(2) that provides a heat sink or cold working fluid, which is used to chill the refrigeration unit 422. The refrigeration unit 422 may be used to provide cold air, chill items, and so forth. The illumination unit 426 may include one or more lights. The drive unit 428 may comprise mechanisms to allow the active furniture 112 to be repositioned without human intervention. For example, the drive unit 428 may include motors and collision sensors allowing the active furniture 112 to move across the room without a push from the user.

Figure 5:
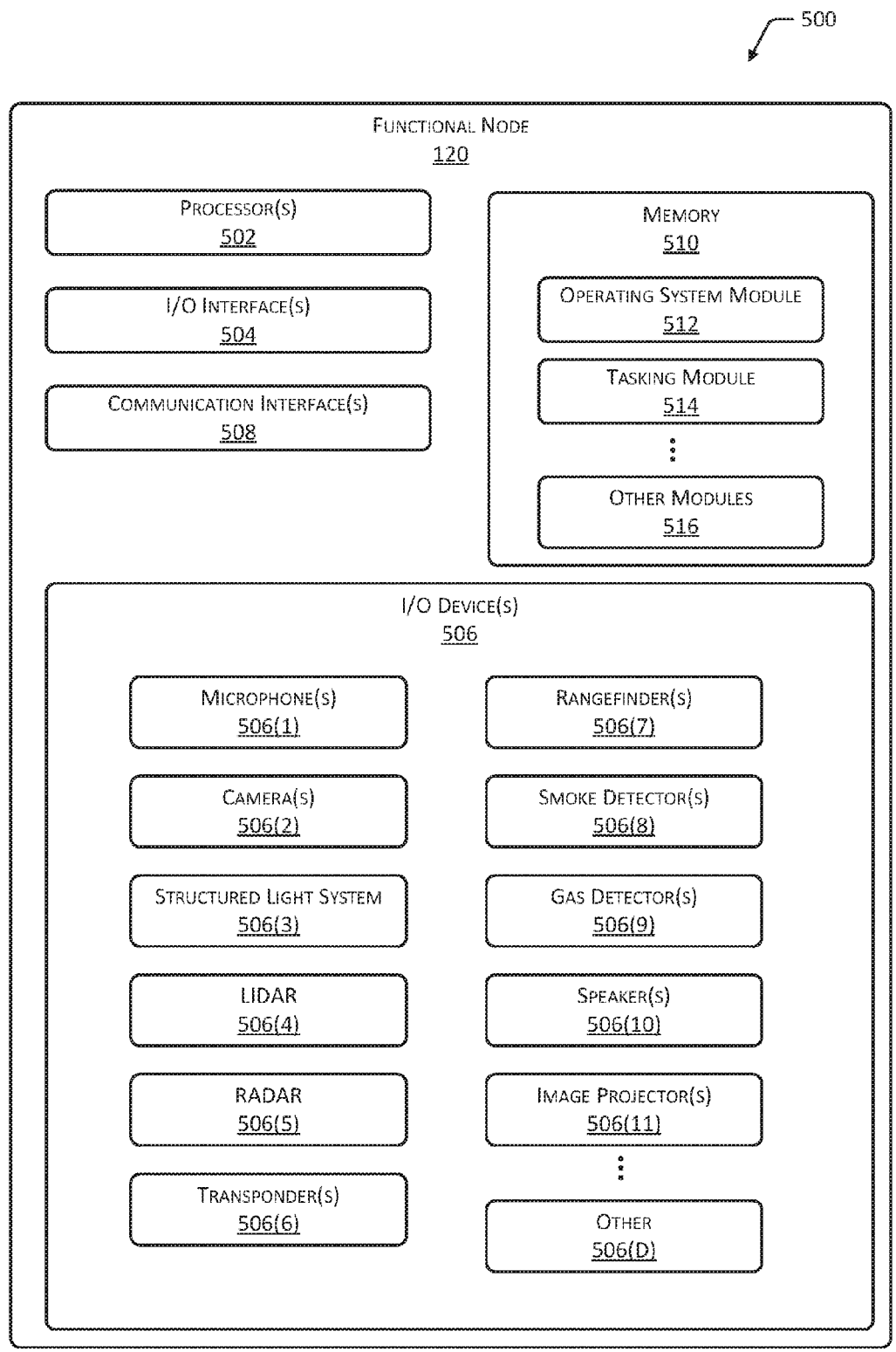
FIG. 5 illustrates a block diagram of a functional node that may support the utility distribution infrastructure.

FIG. 5 illustrates a block diagram 500 of the functional node 120 that may support the utility distribution infrastructure 100. The functional node 120 may provide input, output, or input and output functions to the utility management system 104, the one or more pieces of active furniture 112, or other devices. The functional node 120 may include one or more processors 502 configured to execute one or more stored instructions. The processors 502 may comprise one or more cores. The functional node 120 may include one or more I/O interface(s) 504 to allow the processor 502 or other portions of the functional node 120 to communicate with other devices. The I/O interfaces 504 may comprise I2C, SPI, USB, RS-232, and so forth.

The I/O interface(s) 504 may couple to one or more I/O devices 506. The I/O devices 506 may include one or more of the following input devices: microphones 506(1), cameras 506(2), structured light systems 506(3), light detection and ranging ("LIDAR") systems 506(4), radar systems 506(5), transponder interrogation systems 506(6), rangefinders 506(7), smoke detectors 506(8), gas detectors 506(9), and so forth.

The microphones 506(1) may include one or more devices configured to generate data from sound. The cameras 506(2) may include one or more devices configured to generate image data from visible light, non-visible light, or other wavelengths. For example, the cameras 506(2) may be configured to acquire images in visible, infrared, or terahertz wavelengths. The cameras 506(2) may be configured to provide two-dimensional information, to operate as range cameras providing three-dimensional information, or both. In one implementation, a pair of the cameras 506(2) may be configured to provide stereoscopic images, which may be used to determine position in three-dimensional space of objects in the environment. In another implementation, a single camera 506(2) may use one or more devices configured to provide distance information, such as the structured light system 506(3), the LIDAR system 506(4), the radar system 506(5), rangefinders 506(7), and so forth. For example, the single camera 506(2) may acquire image data, which is then combined with distance information gathered from an optical time-of-flight system to provide spatial information to objects in the image data.

The structured light system 506(3) is configured to provide three-dimensional information, such as described above with respect to FIG. 4. The LIDAR system 506(4) and the radar system 506(5) may be configured to provide information such as three-dimensional data, range and bearing, and so forth, for objects in the environment of the infrastructure 100. The transponder interrogation system 506(6) may be configured to trigger transponder devices located on objects within the infrastructure 100, such as on the active furniture 112, users, and so forth. The rangefinder 506(7) may be configured to use optical, acoustic, or other techniques to determine range, bearing, or both to objects within the infrastructure 100. For example, the rangefinder 506(7) may comprise an optical or ultrasonic ranging system using time-of-flight data to determine distance.

The I/O devices 506 may also include output devices such as one or more speakers 506(10), image projectors 506(11), and so forth. In some embodiments, the I/O devices 506 may be physically incorporated with the functional node 120 or may be externally placed. For example, the image projector 506(11) may be in a separate enclosure. The image projector 506(11) may include a microelectromechanical system ("MEMS") projector, a laser projector, liquid crystal display projector, and so forth. The image projector 506(11) is configured to present an image in visible or non-visible light on one or more surfaces within the infrastructure 100. In some implementations, a display device may be used instead of, or in addition to, the image projector 506(11).

The functional node 120 may also include one or more communication interfaces 508. The communication interfaces 508 may be configured to provide communications between the functional node 120 and other devices, such as functional nodes 120, the utility management system 104, routers, access points, and so forth. The communication interfaces 508 may include personal area networks, wired and wireless LANs, WANs, and so forth. In some implementations, the communication interfaces 508 may be configured to couple to the communication utility 106(6).

The functional node 120 may also include one or more busses or other internal communications hardware or software that allow for the transfer of data between the various modules and components of the functional node 120.

As shown in FIG. 5, the functional node 120 includes one or more memories 510. The memory 510 comprises one or more CRSM. The memory 510 provides storage of computer readable instructions, data structures, program modules, and other data for the operation of the functional node 120.

The memory 510 may include at least one OS module 512. The OS module 512 is configured to manage hardware resource devices such as the I/O interfaces 504, the I/O devices 506, the communication interfaces 508, and provide various services to applications or modules executing on the processors 502. Also stored in the memory 510 may be one or more of the following modules. These modules may be executed as foreground applications, background tasks, daemons, and so forth. In some implementations, the modules or the functions provided by the modules may be distributed across one or more external devices, such as one or more cloud servers.

A tasking module 514 may be configured to provide one or more operations. These operations may be requested by a device, such as the utility management system 104, the active furniture 112, or other devices such as a server coupled to the functional node 120. For example, the tasking module 514 may receive from the active furniture 112 a request and stream of images for presentation using the image projector 506(11). In other implementations, the tasking module 514 may be configured to acquire data, such as location data derived from the structured light system 506(3).

Other modules 516 may also be stored in the memory 510. These other modules 516 may be configured to provide object recognition, object tracking, audio beam forming functions, and so forth.

Illustrative Devices

Figure 6:
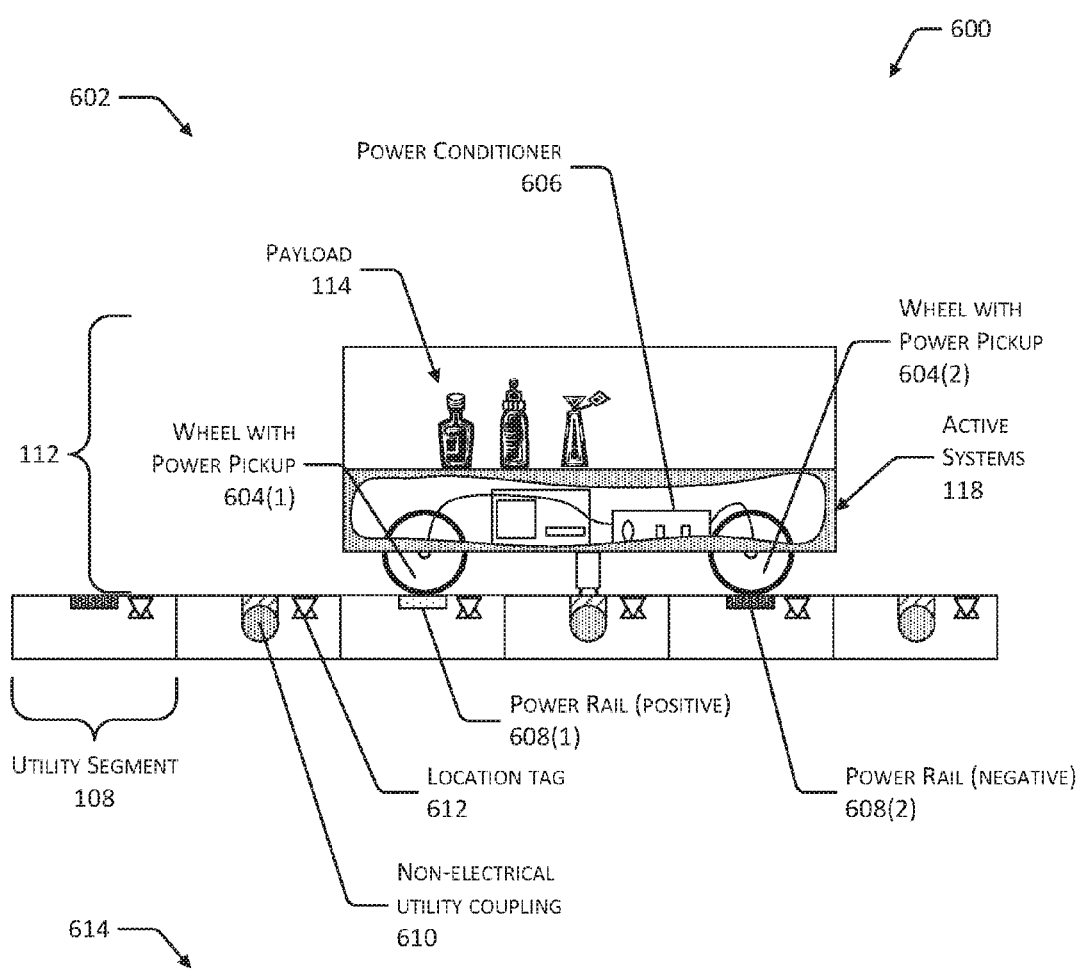
FIG. 6 illustrates one implementation of the utility segments comprising utility couplings configured to provide utilities to the active furniture.
Figure 6:
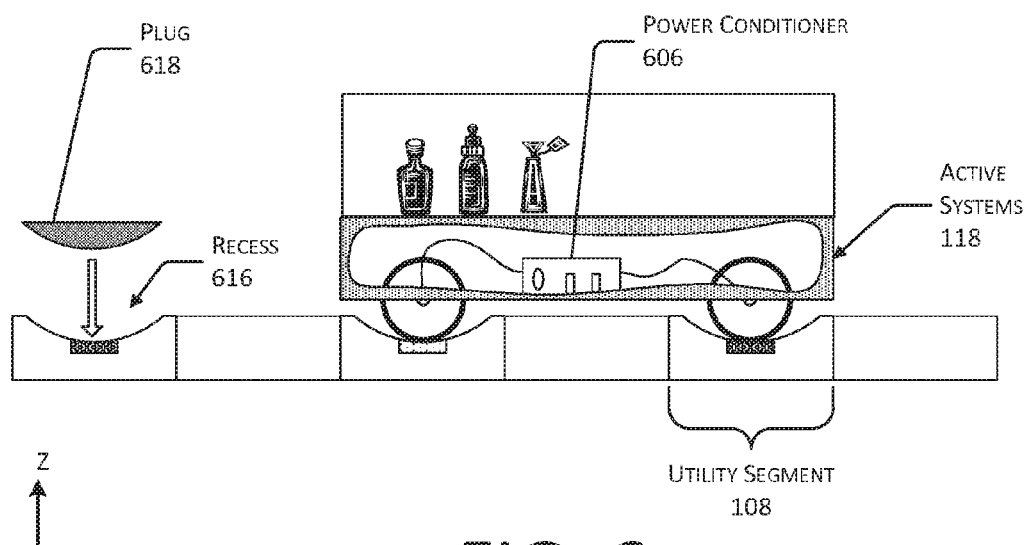

FIG. 6 illustrates side views 600 of the utility segments 108 comprising one or more utility couplings 110 configured to provide utilities 106 to the active furniture 112. A first view 602 depicts the active furniture 112 and the payload 114. Wheels with power pickups 604(1) and 604(2) are depicted. The wheels with power pickups 604 are configured to provide an electrically conductive pathway suitable for the transmission of electrical power by conduction between the utility segment 108 and a power conditioner 606 of the active furniture 112. For example, the wheels with power pickups 604 may have an aluminum outer service or rim, which is coupled using a brush or roller contact to wires or bus bars. The wires or bus bars in turn are coupled to the power conditioner 606. The wheels with power pickups 604 are configured to come into physical contact with power couplings. The power couplings may be configured as power rails 608 or pads, which are arranged within the utility segment 108. A positive power rail 608(1) and a negative power rail 608(2) may be provided to allow for flow of electrical current. The terms "positive" and "negative" are used for illustrative purposes. The rails may also be described as "hot" or "neutral" such as in the case of alternating current. Furthermore, a plurality of rails may be provided to distribute different phases. For example, three-phase alternating current may be supported with four different rails.

The power rails 608 may be configured such that they are at a particular distance, such as several feet apart, to preclude inadvertent shorting or flow of current through other devices or objects present in the infrastructure 100. The power rails 608 may be distributed across one or more of the floor, the walls, or the ceiling of the infrastructure 100.

As described above, the electrical distribution unit 324(1) may be configured to energize those utility segments 108 coupled to the active furniture 112 and deactivate those which are not.

While two wheels with power pickups 604 are depicted, in other implementations, other mechanisms may be used. For example, ball-bearing rollers or conductive slides on the underside of the active furniture 112 may provide electrically conductive pathways for power transfer.

The power conditioner 606 may be configured to provide rectification, filtering, voltage adjustment, frequency adjustment, and so forth. In some implementations, the power conditioner 606 may include power storage capabilities such as batteries, capacitors, and so forth. These power storage capabilities may be used to provide temporary power, such as providing electrical power to the active furniture 112 during repositioning where contact with the power rails 608 may be briefly interrupted. In some implementations, the power conditioner 606 may also act as an uninterruptable power supply during outages of the electrical power utility 106(1).

The utility segments 108 may include one or more non-electrical utility couplings 610. These non-electrical utility couplings 610 may be used to provide the utilities 106 such as thermal 106(2), fluid/gas 106(3), HVAC 106(4), safety 106(5), communications 106(6), material transport 106(7), and so forth. A corresponding or complimentary coupling may be provided on the active furniture 112 to allow the active furniture 112 to connect to the non-electrical utility coupling 610.

In some implementations, the utility couplings 110, the corresponding couplings on the active furniture 112, or both, may be configured to articulate or be repositioned within the utility segment 108. For example, the complimentary coupling on the active furniture 112 may be configured to move in an X-Y plane parallel to the floor of the infrastructure 100 to allow for coupling with the non-electrical utility coupling 610 in the utility segment 108 when the couplings would be otherwise misaligned due to placement of the active furniture 112.

In some implementations, one or more of the utility segments 108 may include location tags 612. These location tags 612 may be optical tags such as bar codes or other machine-readable patterns, RFID tags, NFC tags, and so forth. The location tags 612 may be used in some implementations to provide information about the physical location, orientation, or both of the active furniture 112 in the infrastructure 100. For example, in some implementations, the location tags 612 may include a magnet in a predetermined known orientation. A magnetic field sensor, such as a compass, on the active furniture 112 may be used to determine the orientation relative to the magnet. In other implementations, the Earth's magnetic field, or some other external reference, may be used to determine orientation.

A second side view 614 illustrates a variation, in which some of the utility segments 108 include recesses 616 configured to accept the wheels with power pickups 604. As illustrated, within the recesses 616 may be one or more of the power rails 608. When not in use, the recesses 116 may be filled or concealed with a plug 618 or cover. The recesses 616 may be configured to provide mechanical restraint as well, assisting in holding the active furniture 112 in a particular location. For example, as illustrated here, the recesses 616 include an arcuate cross section with a single power rail 608 at the bottom. Gravity results in the wheel 604 resting at the bottom of the recess 616, which maintains contact with the power rail 608. In some implementations, the recesses 616 may be used without the power rails 608 and wheels may omit the power pickups.

Figure 7:
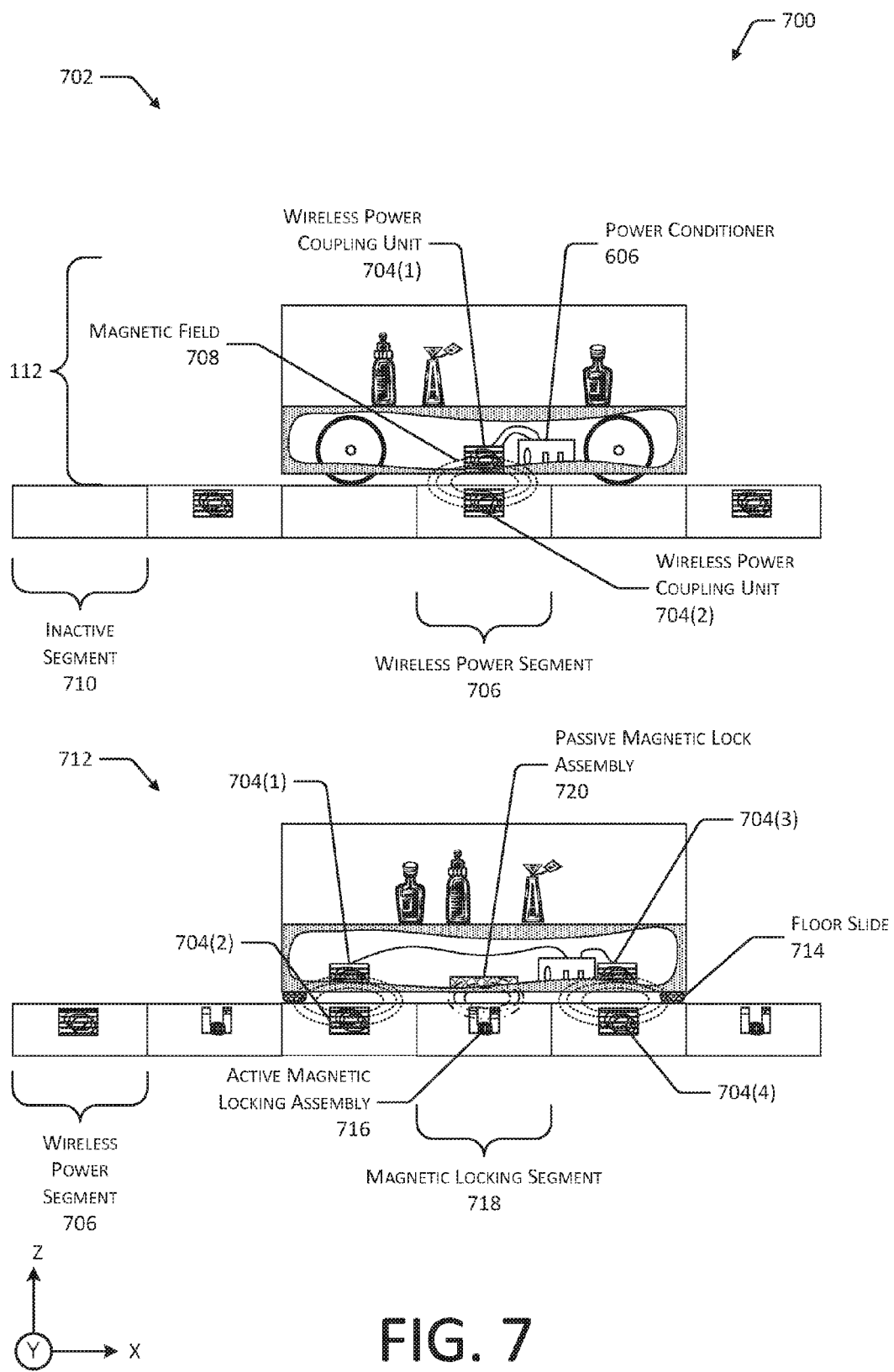
FIG. 7 illustrates utility segments with wireless power couplings configured to provide electrical utility service to the active furniture.

FIG. 7 illustrates wireless power couplings 700 configured to provide electrical utility service 106(1) to the active furniture 112. The electrical utility 106(1) may be provided using physical contact between conductors, as described above in FIG. 6. As shown here, in some implementations wireless power transfer may be used to provide the electrical utility 106(1) to the active furniture 112. Wireless power transfer provides various advantages, such as eliminating the chance for unwanted contact with an energized power rail 608, allowing for sealing against environmental factors such as dirt, water, vandalism, and so forth.

Wireless power transfer may include inductive coupling, capacitive coupling, electromagnetic transfer, and so forth. For example, resonant inductive coupling may be used to transfer power from a coil in or on the utility segment 108 to a corresponding coil in or on the active furniture 112. Electromagnetic transfer includes the use of photovoltaic cells accepting light with wavelengths ranging from infrared to ultraviolet. For example, lighting fixtures in the infrastructure 100 may be configured to provide infrared light to which corresponding photovoltaic cells may produce electrical current. These lighting fixtures may be arranged in the ceiling of the infrastructure 100, within the utility segments 108 comprising the floor, or within the floor itself. Electromagnetic transfer may also include power transfer using microwave wavelengths or other wavelengths.

In this illustration, a first side view 702 depicts the active furniture 112 equipped with a wireless power coupling unit 704(1), which may be coupled to a power conditioner 606. The wireless power coupling unit 704 is configured to send, receive, or send and receive power without using conductors. The wireless power coupling unit 704 may comprise capacitive plates, electromagnetic coils, photovoltaic cells, electromagnetic emitters, microwave rectennas, and so forth.

A corresponding wireless power coupling unit 704(2) is located on or within one or more of the utility segments 108, providing a wireless power segment 706. The wireless power coupling units 704(1) and 704(2) may work in conjunction with one another to transfer power between the electrical utility 106(1) and the active furniture 112. In this illustration, the wireless power coupling units 704 use resonant inductive coupling, which uses a magnetic field 708 to transfer energy without intervening conductors.

Also illustrated are inactive segments 710. These inactive segments 710 provide no utility coupling 110. The inactive segments 710 may contain hardware to provide for transfer of other utilities. For example, the inactive segments 710 may include wiring or piping to transfer utilities 106 between adjacent segments.

While power transfer, both using conductors or wirelessly, has been discussed in terms of providing power to the active furniture 112, in some implementations, the active furniture 112 may provide power back to the electrical distribution unit 324(1). For example, the active furniture 112 may include batteries, generators, and so forth. Power stored or generated onboard the active furniture 112 may then be transferred using the electrical utility 106(1) for distribution to other devices, such as other pieces of active furniture 112, the utility management system 104, and so forth.

A second side view 712 depicts the active furniture 112 using slides or glides 714 instead of wheels. For example, the floor slides 714 may comprise a plastic, ceramic, or other material, which is transparent to the magnetic field 708.

The active furniture 112 may be equipped with more than one wireless power coupling unit 704. For example, additional wireless power coupling units 704 may be provided to improve coupling opportunities with corresponding wireless power segments 706, increase power transfer capacity, and so forth. In this illustration, the active furniture 112 includes two wireless power couplings units 704(1) and 704(3), which are coupled with a pair of corresponding wireless power couplings units 704(2) and 704(4) in the wireless power segments 706.

In some implementations, the active furniture 112 may be restrained to a particular physical location in the infrastructure 100. An active magnetic locking assembly 716 in a magnetic locking segment 718 is depicted here. The active magnetic locking assembly 716 may comprise one or more permanent magnets, electromagnets, and so forth, which are configured to generate a magnetic field that attracts a passive magnetic lock assembly 720 coupled to the active furniture 112. The passive magnetic lock assembly 720 may comprise one or more pieces of ferrous materials that may be attracted by the active magnetic locking assembly 716 when activated.

In some implementations, the passive magnetic lock assembly 720 may comprise at least a portion of a structure of the active furniture 112. For example, the active furniture 112 may be made at least in part from steel. In some implementations, the passive magnetic lock assembly 720 may include one or more permanent magnets. In other implementations, the active furniture 112 may include an active electromagnet.

Figure 8:
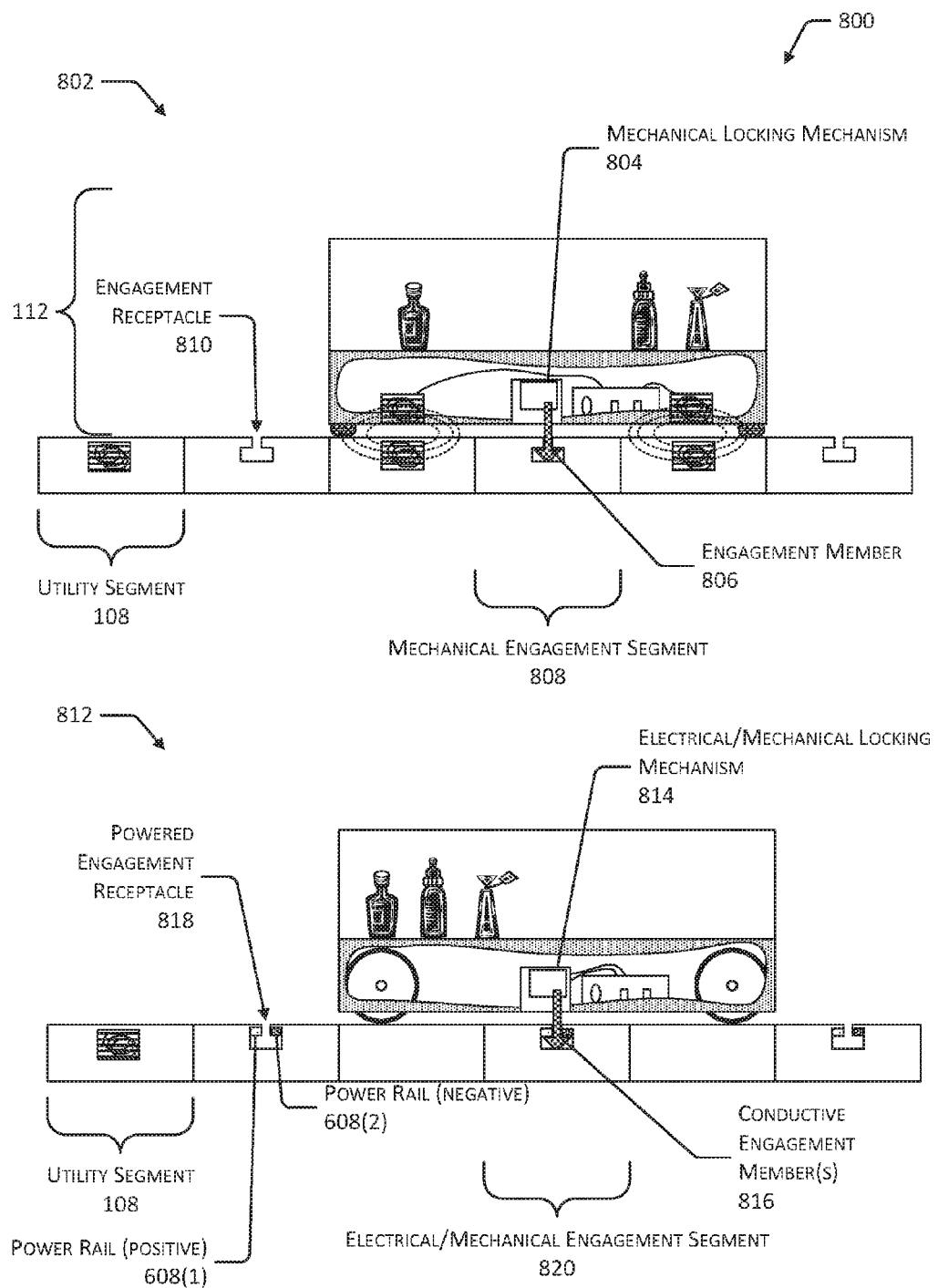
FIG. 8 illustrates mechanical engagement mechanisms configured to restrain the motion of the active furniture and which may be used to provide other utilities.

FIG. 8 illustrates mechanical engagement mechanisms 800 configured to restrain the motion of the active furniture 112. In some implementations, the mechanical engagement mechanisms 800 may provide support for one or more of the utilities 106.

In a first side view 802, the active furniture 112 includes a mechanical locking mechanism 804 including an engagement member 806. The engagement member 806 is configured to couple with a mechanical engagement segment 808 having one or more engagement receptacles 810. Once engaged, the engagement member 806 restrains the motion of the active furniture 112.

In some implementations, the engagement receptacle 810 may be incorporated into other utility segments 108. For example, a single utility segment 108 may provide the wireless power coupling units 704, the engagement receptacle 810, a non-electrical utility coupling 610, and so forth. While a single mechanical locking mechanism 804 and engagement receptacle 810 is depicted, in some implementations, a plurality of such may be used.

In another implementation, the mechanical engagement segment 808 may comprise the engagement member 806 and the mechanical locking mechanism 804. With this implementation, the mechanical locking mechanism 804 may be configured to extend the engagement member 806 upward to couple to a corresponding receptacle on the active furniture 112.

In a second side view 812, the active furniture 112 omits the wireless power coupling units 704. To provide for power transfer, the active furniture 112 includes an electrical/mechanical locking mechanism 814, which includes one or more electrically conductive engagement members 816. The electrically conductive engagement member 816 is configured to mechanically and electrically couple with a powered engagement receptacle 818 in an electrical/mechanical engagement segment 820.

The powered engagement receptacle 818 includes one or more power rails 608. For example, in this illustration, the power rails 608 are configured on opposite sides of the receptacle 818. Once engaged, the active furniture 112 is physically restrained and the electrical utility 106(1) is provided.

Other arrangements of the power rails 608 may be provided, such as coaxial connectors. The powered engagement receptacle 818 may be configured to minimize inadvertent or unintentional contact with the power rails 608 by objects other than the conductive engagement members 816.

While a single electrical/mechanical locking mechanism 814 and powered engagement receptacle 818 is depicted, in some implementations, a plurality of such may be used. Furthermore, as described above, the electrical/mechanical engagement segment 820 may comprise the electrical/mechanical locking mechanism 814 and the conductive engagement member 816, configured to couple to a corresponding receptacle on the active furniture 112.

Figure 9:
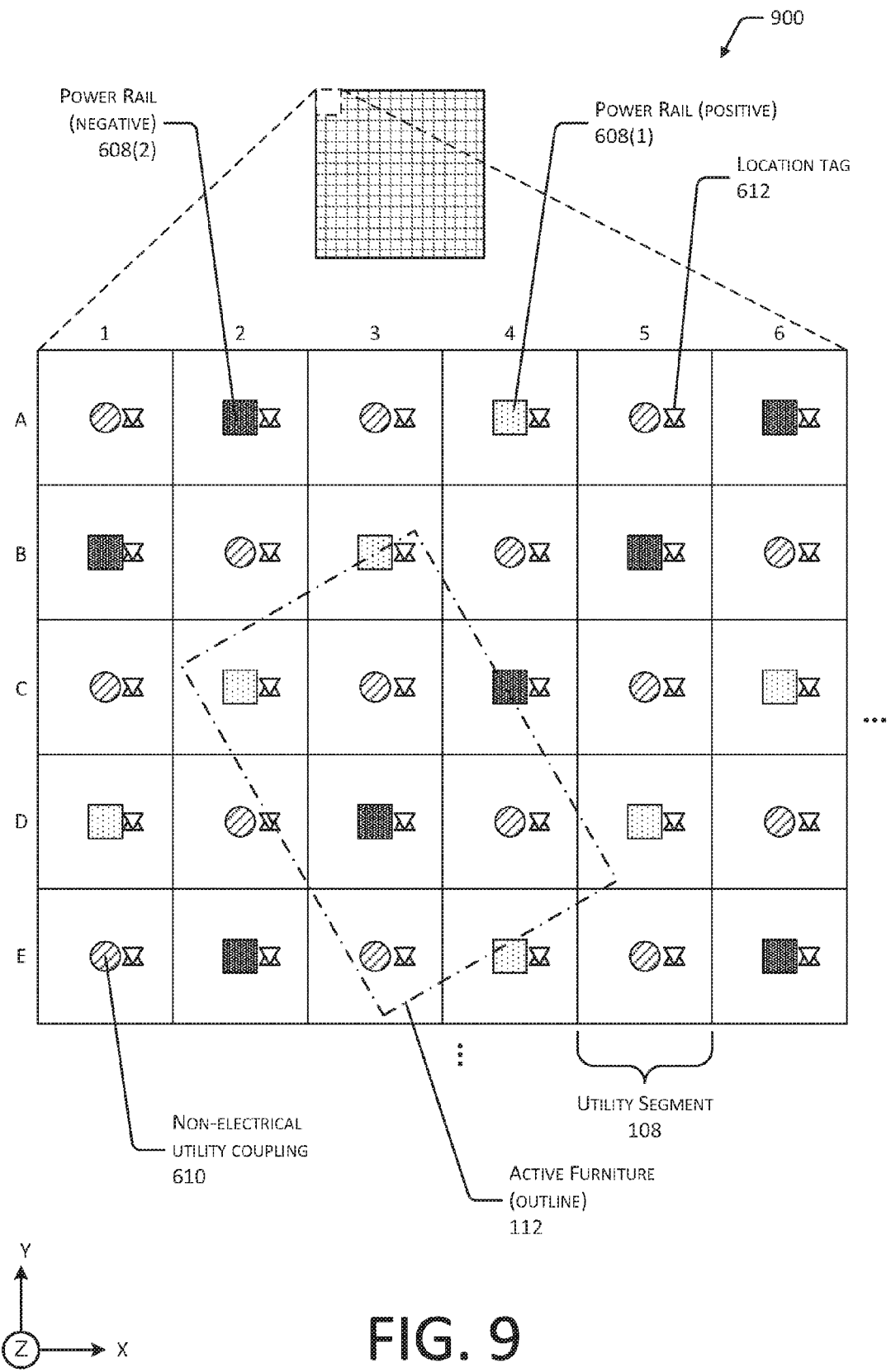
FIG. 9 illustrates an arrangement of utility segments on a floor of the utility distribution infrastructure.

FIG. 9 illustrates, in a top-down view, an arrangement 900 of the utility segments 108 on a portion of a floor of the infrastructure 100. As described above, the utility segments 108 may include one or more utility couplings 110. The utility segments 108 and the inactive segments 710 may be placed in a tessellated arrangement such as depicted in FIG. 9. For example, the utility segments 108 may have a square shape and may be arranged such that particular utility couplings 110 are present in a repeating sequence. The utility segments 108 and inactive segments 710 may comprise different area-filling shapes such as triangles, hexagons, and so forth. In some implementations, the utility segments 108, inactive segments 710, or both may use different shapes. For example, some utility segments 108 may be square while others describe a right triangle with opposite and adjacent sides of the same length.

In the example depicted, each of the utility segments 108 includes a location tag 612 to provide for location information within the infrastructure 100. The utility segments 108 are arranged in a repeating pattern of power rail 608(1), non-electrical utility coupling 610, power rail 608(2), non-electrical utility coupling 610, power rail 608(1), and so on. In this illustration, an outline of a piece of active furniture 112 is indicated with a dashed line. As the piece of active furniture 112 is moved around in the infrastructure 100, regardless of orientation or position, the active furniture 112 is able to couple to at least two power rails 608 and the non-electrical utility coupling 610.

As described above, the utility management system 104 may be configured to control the provisioning of utilities 106 at particular utility segments 108. The utilities 106 may be provided to utility segments 108 having utility couplings 110 which are proximate to, or engaged with, the corresponding couplings of the active furniture 112. For example, the power rails 608 in the utility segments 108 at locations C2 and D3 may be energized, while the other utility segments 108 depicted, which are not associated with other pieces of active furniture 112, are deactivated. Likewise, the non-electrical utility such as the fluid/gas 106(3) or the material transport 106(7) provided by the non-electrical utility coupling 610 at C3, D4, or both, may be activated.

Illustrative Scenarios and Processes

Figure 10:
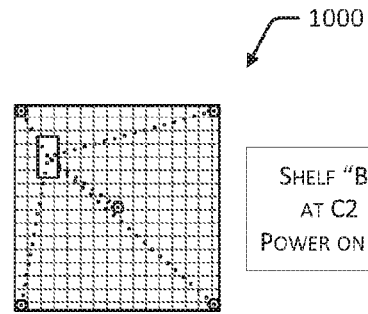
FIG. 10 illustrates a scenario of moving a piece of active furniture from a first physical location to a second physical location.
Figure 10:
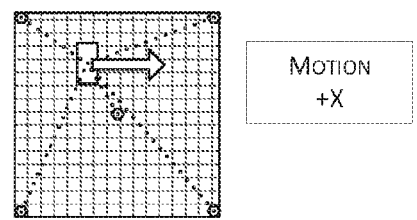
Figure 10:
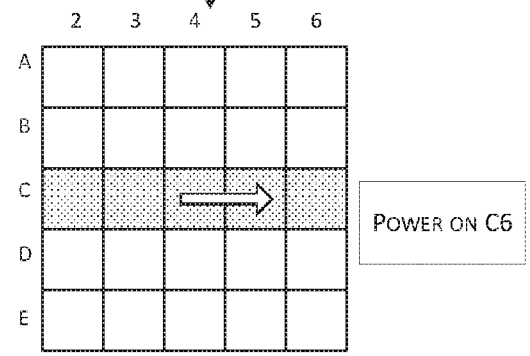
Figure 10:
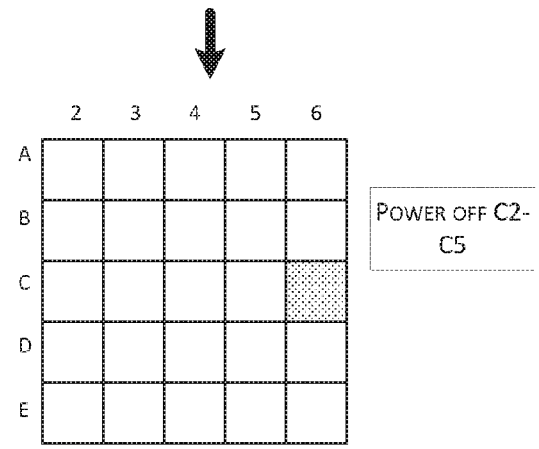

FIG. 10 illustrates a scenario 1000 of moving a piece of active furniture 112 from a first physical location to a second physical location in the infrastructure 100. This scenario may be implemented using one or more of the utility management system 104, the utility segments 108, the active furniture 112, or the one or more functional nodes 120.

At 1002, a first physical location of a piece of active furniture 112 is determined. This location provides placement in physical space of the room of the active furniture 112. In some implementations, the orientation of the active furniture 112 relative to the infrastructure 100 may be determined as well.

The location may be determined by receiving information from the active furniture 112, from the utility management system 104, from information acquired by the functional nodes 120, or a combination thereof. For example, the active furniture 112 may read out information from the location tag 612 in the utility segments 108 and send this data, such as "at location C3, C4, C5, C6". In another example, the utility management system 104 may report that the wireless power coupling unit 704 at C6 is providing power to a piece of active furniture 112. In yet another example, one or more of the functional nodes 120 may use techniques such as bearing and distance data from machine vision systems to find the location of the active furniture 112. In some implementations, the location may be manually specified or input by a user.

At 1004, a motion of the piece of active furniture 112 to a second physical location is determined. For example, the active furniture 112 may report that the onboard sensors no longer report location tag 612 of C2, and are now reporting location C3. In other implementations, other sensors such as accelerometers, gyroscopes, and so forth, may be used to determine motion.

At 1006, one or more utility couplings 110 at the second physical location are activated. For example, the utility management system 104 may energize the wireless power coupling 704 or the power rail(s) 608 at or proximate to C6. In the implementation depicted, a path of utility couplings 110 from the first physical location to the second location is energized to allow for continuous power to the active furniture 112 during motion. In other implementations, the path of utility couplings 110 may not be energized, resulting in discontinuation of providing the electrical power 106(1) until the active furniture 112 is coupled to the wireless power coupling 704 or the power rail(s) 608 at or proximate to the second physical location.

At 1008, one or more of the utility couplings 110 at the first physical location may be deactivated. Continuing the example, the utility couplings 110 providing electrical power at or proximate to locations C2-C5 may be deactivated.

Using these techniques, the utility management system 104 may provide at least some utilities, such as electrical power 106(1), on a dynamic basis to a piece of active furniture 112 while that piece is in motion. In other implementations, the utilities 106 at the first location may be discontinued or deactivated upon determination that the piece of active furniture 112 is in motion, and provisioning of the utilities 106 may not be resumed until the active furniture 112 comes to rest at the second location.

Figure 11:
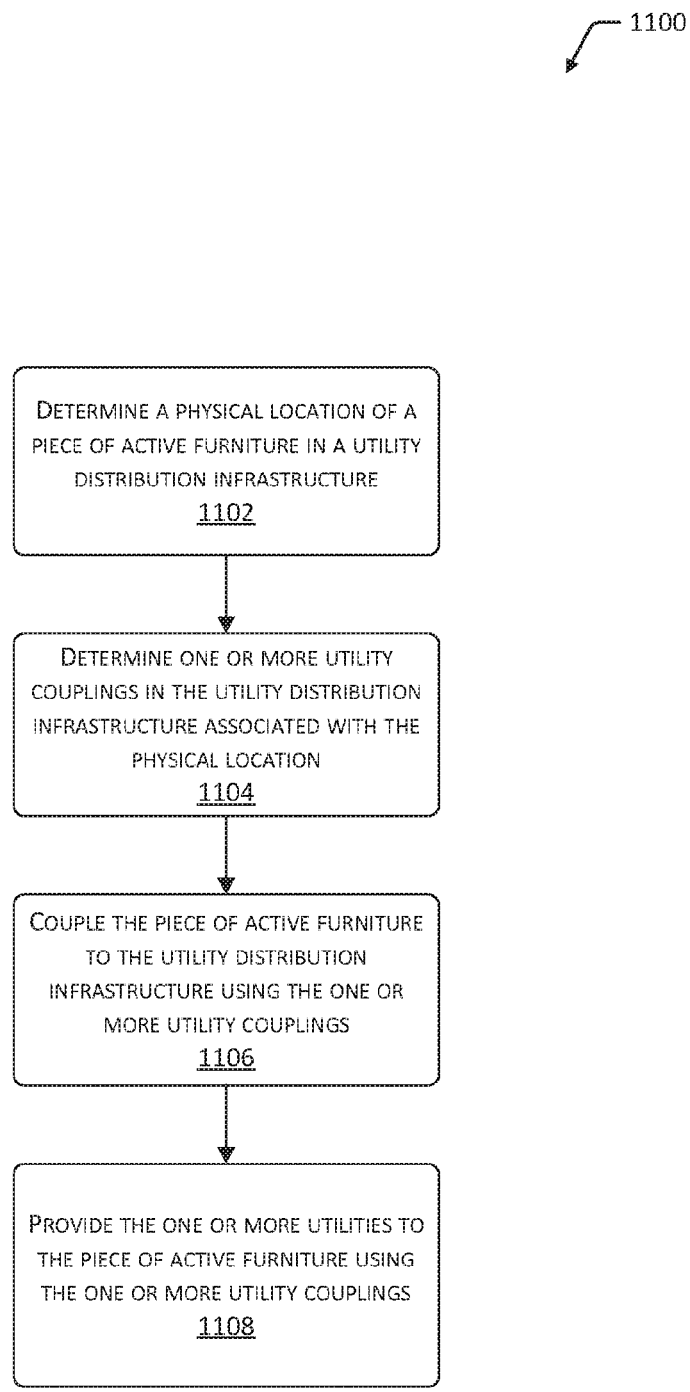
FIG. 11 is a flow diagram of a process of providing utilities to a piece of active furniture based at least in part on determining a location of the active furniture.

FIG. 11 is a flow diagram 1100 of a process of providing the utilities 106 to the piece of active furniture 112 based at least in part on determining location of the active furniture in the infrastructure 100. This process may be implemented using one or more of the utility management system 104, the utility segments 108, the active furniture 112, or the one or more functional nodes 120.

Block 1102 determines a physical location of a piece of active furniture 112 in the utility distribution infrastructure described above. This determination may be made by the active furniture 112, the utility management system 104, one or more of the functional nodes 120, manual entry by a user, or a combination thereof. For example, the utility management system 104 may scan the environment of the infrastructure 100 to locate the piece of active furniture 112.

Block 1104 determines one or more utility couplings 110 in the utility distribution infrastructure associated with the physical location that was determined. For example, location C6 provides a positive power rail 608(1).

Block 1106 couples the piece of active furniture 112 to the utility distribution infrastructure using the one or more utility couplings 110. For example, one of the wheels with power pickup 604 may be in contact with the positive power rail 608(1) at the utility segment 108 at location C6. In other implementations, using wireless power transfer, the wireless power coupling units 704 that are proximate to the location of the piece of active furniture 112 may be determined.

Block 1108 provides the one or more utilities 106 to the piece of active furniture 112 using the one or more utility couplings 110. For example, the utility management system 104 may direct the electrical distribution unit 324(1) to energize the positive power rail 608(1) at location C6. In the situation where the wireless power coupling units 704 are in use, the units which are proximate to the location of the piece of active furniture may be energized for transmission of electrical power.

In some implementations, the utility management system 104 may be configured to determine power transfer indicative of inductive coupling between the portion of the one or more wireless power coupling units 704(2) and the corresponding active furniture inductive wireless power coupling unit 704(1). The utility management system 104 may then be configured to deactivate the one or more of the wireless power coupling units 704 which are not drawing power.

With utilities 106 service established, the active systems 118 in the active furniture 112 may begin to use these utilities. For example, the active systems 118 may begin to use the electrical utility 106(1) to operate the onboard devices.

The utility management system 104 may also be configured to deactivate the one or more utilities to the utility couplings 110 which are not coupled to the one or more pieces of active furniture 112. For example, the utilities 106 supplying the utility couplings 110 in the utility segments 108 which have no piece of active furniture 112 nearby may be turned off.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium, and so forth. Separate instances of these programs can be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations.

Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A system comprising:
   one or more pieces of active furniture comprising:
     one or more shelves configured to hold one or more retail items; and
     one or more active systems configured to use electrical power;
   a floor supporting the one or more pieces of active furniture, the floor comprising a plurality of inductive wireless power coupling units configured to transmit electrical power to the one or more pieces of active furniture; and
   a utility management system configured to:
     determine a location of the one or more pieces of active furniture; and
     based at least in part on the location, control an electrical distribution unit coupled to the plurality of inductive wireless power coupling units to energize at least one of the plurality of inductive wireless power coupling units proximate to the location for transmission of electrical power.

2. The system of claim 1, wherein the utility management system is further configured to:
   determine power transfer indicative of inductive coupling between the at least one of the plurality of wireless power coupling units and a corresponding active furniture inductive wireless power coupling unit; and
   deactivate one or more of the plurality of inductive wireless power coupling units which are not transferring power to the corresponding active furniture inductive wireless power coupling unit.

3. The system of claim 1, the floor further comprising: a plurality of interconnected utility segments, each of the plurality of interconnected utility segments having one or more inductive wireless power coupling units and configured with one or more electrical conductors configured to provide electrical power to one or more adjacent utility segments.

4. The system of claim 1, wherein the one or more active systems comprise a computing device coupled to a display and one or more input devices, the computing device configured to provide an interactive user interface including a user interface on the display comprising additional information about the one or more retail items and responsive to one or more user inputs at the one or more input devices.

5. A system comprising:
   a plurality of utility couplings distributed across a floor, wherein the plurality of utility couplings are configured to couple to one or more pieces of active furniture;
   a utility management system configured to control provisioning of one or more utilities to the plurality of utility couplings; and
   a communication system configured to send data to and receive data from the one or more pieces of active furniture.

6. The system of claim 5, wherein the one or more utilities comprises electricity and the plurality of utility couplings comprising a plurality of electrically conductive elements configured to physically contact two or more electrical conductors of the one or more pieces of active furniture.

7. The system of claim 5, wherein the one or more utilities comprise electricity and the plurality of utility couplings comprising a plurality of wireless power couplings configured to transfer power to the one or more pieces of active furniture without a conductor using resonant inductive coupling.

8. The system of claim 5, wherein the one or more utilities comprise one or more of thermal energy, fluid, gas, heating ventilation and air conditioning air, or safety data signals.

9. The system of claim 5, wherein the communication system is configured to transfer the data using one or more of the plurality of utility couplings.

10. The system of claim 5, wherein the utility management system is further configured to discontinue delivery of the one or more utilities to one or more of the plurality of utility couplings which are not coupled to the one or more pieces of active furniture.

11. The system of claim 5, wherein at least a portion of the plurality of utility couplings are embedded within the floor.

12. The system of claim 5, further comprising: a mechanical locking mechanism configured to engage at least a portion of the one or more pieces of active furniture to restrain the one or more pieces of active furniture.

13. The system of claim 5, further comprising: a magnetic locking mechanism configured to engage at least a portion of the one or more pieces of active furniture with one or more magnetic fields configured to restrain the one or more pieces of active furniture.

14. The system of claim 5, wherein at least a portion of the plurality of utility couplings comprise one or more structures attached to an upper surface of the floor.

15. The system of claim 5, wherein at least a portion of the plurality of utility couplings are arranged within a receptacle at least partially within the floor.

16. A piece of active furniture comprising:
a moveable chassis supporting a payload, the payload comprising one or more items for sale;
one or more utility couplings configured to couple to one or more of a plurality of utility couplings distributed across a floor; and
one or more active systems configured to use one or more utilities provided by the one or more of the plurality of utility couplings.

17. The piece of active furniture of claim 16, wherein the plurality of utility couplings comprise one or more of wireless power coupling units, electrically conductive contacts, optical light guides, connectors configured to carry a fluid or a gas, or passages for material transport.

18. The piece of active furniture of claim 16, wherein the plurality of utility couplings comprise one or more wheels configured to conduct an electrical current.

19. The piece of active furniture of claim 16, wherein the one or more active systems further comprising: a processor, a memory coupled to the processor, a communication interface coupled to the processor, and a display coupled to the processor; and
wherein the one or more active systems are configured to:
retrieve information associated with the one or more items from an external device accessible with the communication interface; and
present the information on the display.

20. The piece of active furniture of claim 16, the one or more active systems further comprising: a processor, a memory coupled to the processor, a communication interface coupled to the processor, a user input device coupled to the processor, and a display coupled to the processor; and
wherein the one or more active systems are configured to:
present a user interface on the display, wherein the user interface comprises information associated with the one or more items;
receive user input with the user input device; and
update the user interface responsive to the user input.

21. A system comprising:
a plurality of utility couplings distributed across a floor, wherein the plurality of utility couplings are configured to couple to one or more pieces of active furniture; and
a utility management system to control provisioning of one or more utilities to the plurality of utility couplings.

22. A system comprising:
a plurality of utility couplings distributed across a floor, wherein the plurality of utility couplings are configured to couple to one or more pieces of active furniture and the plurality of utility couplings comprising at least one electrical utility coupling and at least one non-electrical utility coupling.

* * * * *